United States Patent [19]
Umetsu et al.

[11] Patent Number: 6,121,388
[45] Date of Patent: Sep. 19, 2000

[54] POLYAMIDE RESIN COMPOSITION

[75] Inventors: Hidevuki Umetsu; Masahiro Sugimura; Yoshiki Makabe, all of Nagoya, Japan

[73] Assignee: Toray Industries, Inc., Japan

[21] Appl. No.: 09/287,045

[22] Filed: Apr. 6, 1999

[30] Foreign Application Priority Data

May 12, 1998 [JP] Japan .................................. 10-129352

[51] Int. Cl.[7] ...................................................... C08L 77/00
[52] U.S. Cl. ............................ 525/425; 525/426; 525/432
[58] Field of Search ..................................... 525/425, 426, 525/432

[56] References Cited

U.S. PATENT DOCUMENTS

| | | | |
|---|---|---|---|
| 5,258,470 | 11/1993 | Poll et al. | 525/425 |
| 5,470,909 | 11/1995 | Nishii et al. | 524/538 |

FOREIGN PATENT DOCUMENTS

| | | |
|---|---|---|
| 0 438 128 A2 | 7/1991 | European Pat. Off. . |
| 0438128 | 7/1991 | European Pat. Off. . |
| 0 535 650 A2 | 4/1993 | European Pat. Off. . |
| 0 566 149 A2 | 10/1993 | European Pat. Off. . |
| 9-012875 | 1/1997 | Japan . |

*Primary Examiner*—Ana Woodward
*Attorney, Agent, or Firm*—Austin R. Miller

[57] ABSTRACT

A polyamide resin composition comprising 100 parts by weight of a polyamide resin, from 0.01 to 100 parts by weight of a liquid-crystalline resin, and from 0.01 to 5 parts by weight of an acid anhydride all the time has good fluidity even when it is left for a relatively long period of residence time in a cylinder of a molding machine while it is molded, and has good moldability. The amount of cushion resin needed for molding the composition fluctuates little, and the failure such as cobwebbing in molding the composition is reduced. The moldings of the composition have good impact resistance and good outward appearance. The composition is most suitable to producing box-type moldings with thin-wall parts.

5 Claims, No Drawings

POLYAMIDE RESIN COMPOSITION

BACKGROUND OF THE INVENTION

1. Field of the Invention:

The present invention relates to a moldable polyamide resin composition. The advantages of the composition are that, while dwelling in mold cylinders, it retains good fluidity, that the amount of cushion resin needed for molding the composition fluctuates little, and that occurrence of failure such as cobwebbing in molding the composition is reduced; and the advantages of the moldings of the composition are that they have good impact resistance and good appearance.

2. Description of Related Art:

As having good mechanical properties, good abrasion resistance, good electric properties, good chemical resistance and good workability, polyamide resins such as typically nylon 6 and nylon 66 are widely used as engineering plastics in various fields, for example, in the field of automobiles, in the field of electric and electronic appliances and in other fields of building materials, sundries, etc.

High-quality plastics of many applications are being much needed in those fields, and improving the quality of plastics is therefore much desired. For example, in the field of automobiles, it is desired to reduce as much as possible the destruction of the environment owing to exhaust gas. For this, automobile parts are being small-sized and thin-walled so as to produce lightweight and compact cars. On the other hand, in the field of electric and electronic appliances, portable personal computers are being popularized, and housings for them are desired to be lightweight. At present, polyamide resins are used for the applications in those fields, and it is desired to further reduce the wall thickness of the moldings of polyamide resins. For this, the fluidity of polyamide resins must be improved.

In that situation, a large number of polymers having various novel characteristics have been developed and put on the market. Of those, optically-anisotropic, liquid-crystalline polymers characterized by the parallel orientation of molecular chains are specifically noticed, as having high fluidity and good mechanical properties. In particular, as the polymers of those types have especially high strength and stiffness, there is much increasing great demand for small-sized moldings of the polymers in the field of electrical engineering and electronics and also in the field of office appliances. Various techniques of mixing two different resins, liquid-crystalline resin and thermoplastic resin, have heretofore been proposed so as to obtain resin mixtures having good characteristics of the two resins, for example, as in JP-A 56-115357, 1-259062, 3-54222, 5-86286, 9-12875, etc.

However, merely mixing the two polymers could not produce significant improvements in the physical properties of the resulting mixture, since the two polymers do not have good compatibility with each other. Because of their poor compatibility, either one of the two polymers a foreign impurity component in the mixture of the two, whereby the impact strength of the moldings of the mixture is lowered. In addition, it has been found that, when the mixture is molded in a large-sized molding machine, it often undergoes amide-ester interaction owing to long residence time in the mold. As a result, the fluidity of the mixture in the mold is rather lowered, contrary to the intended object of increasing the fluidity of resin mixtures. JP-A-9-12875 discloses a resin composition comprising a specific, terminal-blocked polyamide and a liquid-crystalline resin. In this, they say that monocarboxylic acids and acid anhydrides are usable as the terminal-blocking agent for the polyamide. Specifically, the invention disclosed is to blend a polyamide and a liquid-crystalline resin in a simple ordinary mixing manner, in which the polyamide is terminal-blocked during its polymerization so as to retard the interaction with the liquid-crystalline resin in the resulting mixture. In the disclosed method, however, the compatibility of the two polymers is still poor, and the physical properties of the resulting mixture of the two polymers are inevitably degraded. We, the present inventors tried the method, using a large-sized molding machine for producing large-sized moldings, and, as a result, have found that, since the resin mixture inevitably dwells in the cylinder, it decomposes or foams and even its viscosity increases. In our experiment, therefore, the fluidity of the resin mixture rather lowered. It is believed that the phenomenon of the viscosity increase to lower the fluidity of the resin mixture was caused by amide-ester interaction having occurred between the two resins in the mixture.

SUMMARY OF THE INVENTION

The object of the invention is to provide a polyamide resin composition capable of being worked at temperatures at which conventional polyamide resins are worked. The other advantages of the composition are that the composition does not lose good characteristics intrinsic to ordinary polyamide resins, that it keeps good fluidity all the time even when it stays in mold cylinders so as to be molded into moldings having specific morphology, that the amount of cushion resin needed for molding the composition fluctuates little, that failure such as cobwebbing in molding the composition is reduced, and that moldings made of the composition have good impact resistance and good appearance.

To attain these objects, the invention provides a polyamide resin composition comprising 100 parts by weight of a polyamide resin, from 0.01 to 100 parts by weight of a liquid-crystalline resin, and from 0.01 to 5 parts by weight of an acid anhydride.

Preferred embodiments of the invention are mentioned below.

In the composition, the liquid crystal transition temperature of the liquid-crystalline resin is not higher than the melting point of the polyamide resin.

The composition additionally contains a filler in an amount of from 0.5 to 300 parts by weight relative to the sum total of the polyamide resin, the liquid-crystalline resin and the acid anhydride of being 100 parts by weight.

In the composition, the melt viscosity of the liquid-crystalline resin is not higher than 50 Pa·s, as measured at a temperature of the melting point of the polyamide resin +25° C. and at a shear rate of 1000 sec$^{-1}$.

In the composition, the acid anhydride is at least one selected from succinic anhydride, 1,8-naphthalic anhydride, phthalic anhydride and maleic anhydride.

A box-type molding can be made with thin-wall parts of the polyamide resin composition, in which thin-wall parts having a thickness of at most 1.0 mm account for at least 10% of the total surface area of the molding.

DESCRIPTION OF THE PREFERRED EMBODIMENTS

Embodiments of the invention are described in detail. "Weight" as referred to herein indicates "mass".

The polyamide resin for use in the invention is meant to indicate nylon to be prepared from starting materials of an amino acid, a lactam or a diamine, and a dicarboxylic acid. Specific examples of the starting materials include amino acids such as 6-aminocaproic acid, 11-aminoundecanoic acid, 12-aminododecanoic acid, para-aminomethylbenzoic acid, etc.; lactams such as ε-aminocaprolactam, (ω-laurolactam, etc.; aliphatic, alicyclic or aromatic diamines such as tetramethylenediamine, hexamethylenediamine, 2-methylpentamethylenediamine, nonanemethylenediamine, undecamethylenediamine, dodecamethylenediamine, 2,2,4-/2,4,4-trimethylhexamethylenediamine, 5-methylnonamethylenediamine, metaxylenediamine, paraxylylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl) propane, bis(aminopropyl)piperazine, aminoethylpiperazine, etc.; aliphatic, alicyclic or aromatic dicarboxylic acids such as adipic acid, suberic acid, azelaic acid, sebacic acid, dodecane-diacid, terephthalic acid, isophthalic acid, 2-chloroterephthalic acid, 2-methylterephthalic acid, 5-methylisophthalic acid, 5-sodium-sulfoisophthalic acid, hexahydroterephthalic acid, hexahydroisophthalic acid, etc. In the invention, nylon homopolymers or copolymers to be derived from those starting materials are used herein either singly or as mixtures.

Nylon resins having good heat resistance and strength, having a melting point of not lower than 200° C., are especially preferred as the polyamide resin for use in the invention. As specific examples, mentioned are polycapramide (nylon 6), polyhexamethylenadipamide (nylon 66), polytetramethylenadipamide (nylon 46), polyhexamethylenesebacamide (nylon 610), polyhexamethylenedodecamide (nylon 612), polynonanemethyleneterephthalamide (nylon 9T), polyhexamethylenadipamide/polyhexamethyleneterephthalamide copolymer (nylon 66/6T), polyhexamethyleneterephthalamide/polycapramide copolymer (nylon 6T/6), polyhexamethylenadipamide/polyhexamethylenisophthalamide copolymer (nylon 66/6I), polydodecamide/polyhexamethyleneterephthalamide copolymer (nylon 12/6T), polyhexamethylenadipamide/polyhexamethyleneterephthalamide/-polyhexamethylenisophthalamide copolymer (nylon 66/6T/6I), polyhexamethyleneterephthalamide/-polyhexamethylenisophthalamide copolymer (nylon 6T/6I), polyhexamethyleneterephthalamide/poly(2-methylpentamethyleneterephthalamide) copolymer (nylon 6T/M5T), polyxylylenadipamide (nylon XD6), as well as their mixtures and copolymers, etc.

Especially preferred are nylon 6, nylon 66, nylon 610, nylon 46, nylon 9T, nylon 6/66 copolymer, nylon 6/12 copolymer, nylon 9T, nylon 6T/6 copolymer, nylon 66/6T copolymer, nylon 6T/6I copolymer, nylon 66/6T/6I copolymer, nylon 12/6T copolymer, nylon 6T/M5T copolymer, etc. Practically, it is often preferable to use these nylon resins in the form of mixtures, depending on the desired characteristics such as moldability, heat resistance and water absorption resistance of the resins.

The degree of polymerization of the polyamide resin for use in the invention is not specifically defined. Preferably, however, the relative viscosity of the resin, as measured in a solution of concentrated sulfuric acid to have a resin concentration of 1%, at 25° C., may fall between 1.5 and 5.0, more preferably between 2.0 and 4.0.

The terminal amino content of the polyamide resin for use in the invention is not specifically defined, but is preferably at most $100 \times 10^{-6}$ equivalents/g, more preferably at most $70 \times 10^{-6}$ equivalents/g, even more preferably at most $50 \times 10^{-6}$ equivalents/g.

The method for measuring the terminal amino content of the polyamide resin for use in the invention is not specifically defined. For example, 20 mg of a sample is weighed in an NMR sample tube, dissolved in 0.6 ml of a solvent (hexafluoroisopropanol-d'2) added thereto, and subjected to NMR spectrometry at a frequency of 599.9 MHz.

The liquid-crystalline resin for use in the invention is one capable of forming an anisotropic melt phase. For example, it includes liquid-crystalline polyesters comprising structural units that are selected from aromatic oxycarbonyl units, aromatic dioxy units, aromatic dicarbonyl units, ethylenedioxy units and the like, and capable of forming an anisotropic melt phase; liquid-crystalline polyesteramides comprising structural units selected from those mentioned above, along with other structural units that are selected from aromatic iminocarbonyl units, aromatic diimino units, aromatic iminoxy units and the like, and capable of forming an anisotropic melt phase; etc.

The aromatic oxycarbonyl units include, for example, structural units derived from p-hydroxybenzoic acid, 6-hydroxy-2-naphthoic acid, etc.; the aromatic dioxy units include, for example, those from 4,4'-dihydroxybiphenyl, hydroquinone, 3,3',5,5'-tetramethyl-4,4'-dihydroxybiphenyl, t-butylhydroquinone, phenylhydroquinone, 2,6-dihydroxynaphthalene, 2,7-dihydroxynaphthalene, 2,2-bis (4-hydroxyphenyl)propane, 4,4'-dihydroxydiphenyl ether, etc.; the aromatic dicarbonyl units include, for example, those from terephthalic acid, isophthalic acid, 2,6-naphthalenedicarboxylic acid, 4,4'-diphenyldicarboxylic acid, 1,2-bis(phenoxy)ethane-4,4'-dicarboxylic acid, 1,2-bis (2-chlorophenoxy)ethane-4,4'-dicarboxylic acid, 4,4'-diphenyl ether-dicarboxylic acid, etc.; the aromatic iminoxy units include, for example, those from 4-aminophenol, etc.

As specific examples of the liquid-crystalline polyesters, mentioned are liquid-crystalline polyesters comprising structural units derived from p-hydroxybenzoic acid, those from 6-hydroxy-2-naphthoic acid, and those from aromatic dihydroxy compounds and/or aliphatic dicarboxylic acids; liquid-crystalline polyesters comprising structural units derived from p-hydroxybenzoic acid, those from 4,4'-dihydroxybiphenyl, and those from terephthalic acid and adipic acid; liquid-crystalline polyesters comprising structural units derived from p-hydroxybenzoic acid, those from aromatic dihydroxy compounds such as 4,4'-dihydroxybiphenyl, hydroquinone, etc., and those from terephthalic acid and/or 2,6-naphthalene-dicarboxylic acid; liquid-crystalline polyesters comprising structural units derived from p-hydroxybenzoic acid, those from ethylene glycol, and those from terephthalic acid and isophthalic acid; liquid-crystalline polyesters comprising structural units derived from p-hydroxybenzoic acid, those from ethylene glycol, those from 4,4'-dihydroxybiphenyl, and those from terephthalic acid and/or sebacic acid; liquid-crystalline polyesters comprising structural units derived from p-hydroxybenzoic acid, those from ethylene glycol, those from aromatic dihydroxy compounds, those from aromatic dicarboxylic acids such as terephthalic acid, isophthalic acid, 2,6-naphthalene-dicarboxylic acid, etc.

Preferred examples of the liquid-crystalline polyesters capable of forming an anisotropic melt phase are liquid-crystalline polyesters comprising structural units of the following (I), (II), (III) and (IV), and liquid-crystalline polyesters comprising structural units of the following (I), (III) and (IV) and capable of forming an anisotropic melt phase.

(I)

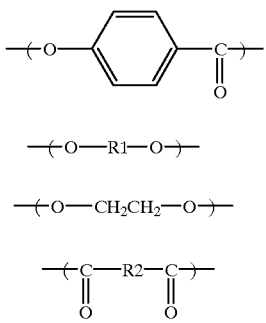

(II)

—(O—R1—O)—

(III)

—(O—CH₂CH₂—O)—

(IV)

—(C—R2—C)—
  ‖     ‖
  O     O wherein $R_1$ represents one or more groups selected from the following:

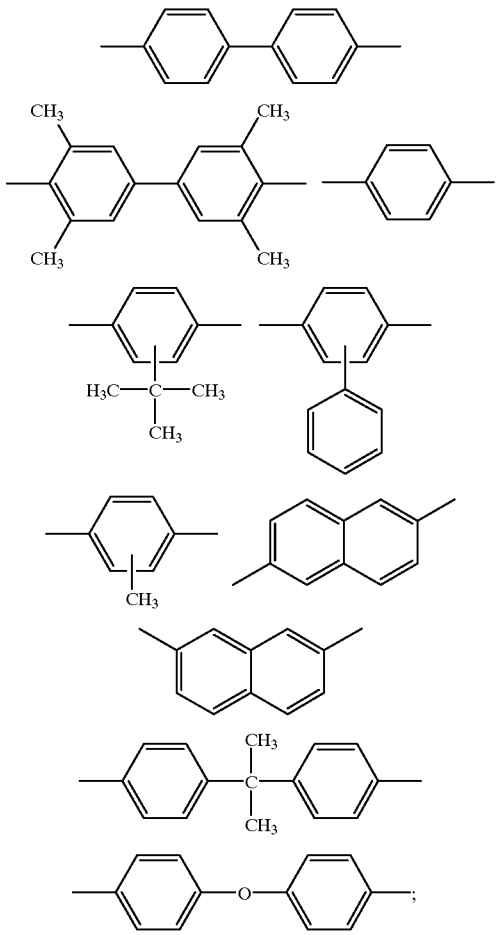

$R_2$ represents one or more groups selected from the following:

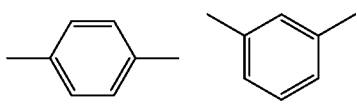

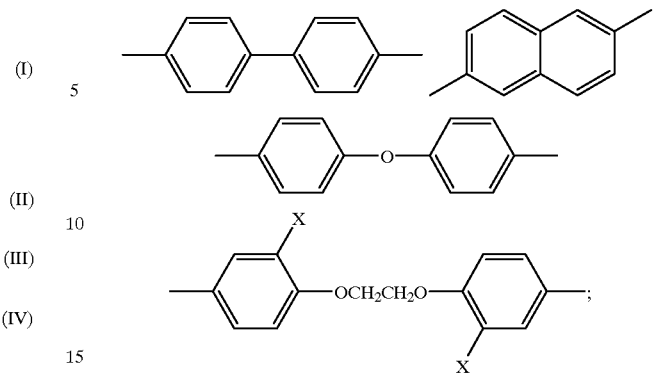

X represents a hydrogen atom or a chlorine atom.

The structural unit (I) is derived from p-hydroxybenzoic acid; the structural unit (II) is from at least one aromatic dihydroxy compound selected from 4,4'-dihydroxybiphenyl, 3,3',5,5'-tetramethyl-4,4'-dihydroxybiphenyl, hydroquinone, t-butylhydroquinone, phenylhydroquinone, methylhydroquinone, 2,6-dihydroxynaphthalene, 2,7-dihydroxynaphthalene, 2,2-bis(4-hydroxyphenyl)propane and 4,4'-dihydroxydiphenyl ether; the structural unit (III) is from ethylene glycol; and the structural unit (IV) is from at least one aromatic dicarboxylic acid selected from terephthalic acid, isophthalic acid, 4,4'-diphenyldicarboxylic acid, 2,6-naphthalene-dicarboxylic acid, 1,2-bis(phenoxy)ethane-4,4'-dicarboxylic acid, 1,2-bis(2-chlorophenoxy)ethane-4,4'-dicarboxylic acid and 4,4'-diphenyl ether-dicarboxylic acid.

Of the structural units mentioned above, especially preferred are those where $R_1$ is the following:

[4]

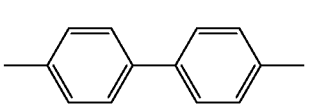

Also preferably, $R_2$ is the following:

[5]

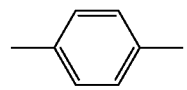

Preferred liquid-crystalline polyesters for use in the invention are the copolymers comprising the structural units (I), (III) and (IV), and the copolymers comprising the structural units (I), (II), (III) and (IV), in which the copolymerizing ratio of those units (I), (II), (III) and (IV) may be freely defined. However, in order to obtain good results of the invention, the copolymerizing ratio is preferably as follows:

In the copolymers comprising the structural units (I), (III) and (IV), the structural units (I) are preferably from 30 to 80 mol %, more preferably from 45 to 75 mol % of the total of the structural units (I), (III) and (IV).

In the copolymers comprising the structural units of (I), (II), (III) and (IV), the total of the structural units (I) and (II) is preferably from 30 to 95 mol %, more preferably from 40 to 85 mol % of the total of the structural units (I), (II) and (III). The structural units (III) are preferably from 5 to 70 mol %, more preferably from 15 to 60 mol % of the total of the structural units (I), (II) and (III). The molar ratio of the structural units (I) to (II), (I)/(II), is preferably from 75/25 to 95/5, more preferably from 78/22 to 93/7. Preferably, the structural units (IV) are substantially equimolar to the total of the structural units (II) and (III).

Liquid-crystalline polyester-amides are also usable in the invention. Preferably, these comprise p-iminophenoxy units to be derived from p-aminophenol, in addition to the structural units (I) to (IV) noted above, and are capable of forming an anisotropic melt phase.

The liquid-crystalline polyesters and polyester-amides which are preferably used in the invention may comprise, in addition to the structural units (I) to (IV) mentioned above, any other structural units from comonomers of, for example, aromatic dicarboxylic acids such as 3,3'-diphenyldicarboxylic acid, 2,2'-diphenyldicarboxylic acid, etc.; aliphatic dicarboxylic acids such as adipic acid, azelaic acid, sebacic acid, dodecane-dicarboxylic acid, etc.; alicyclic dicarboxylic acids such as hexahydroterephthalic acid, etc.; aromatic diols such as chlorohydroquinone, 3,4'-dihydroxybiphenyl, 4,4'-dihydroxydiphenylsulfone, 4,4'-dihydroxydiphenyl sulfide, 4,4'-dihydroxybenzophenone, 3,4'-dihydroxybiphenyl, etc.; aliphatic and alicyclic diols such as propylene glycol, 1,4-butanediol, 1,6-hexanediol, neopentyl glycol, 1,4-cyclohexanediol, 1,4-cyclohexanedimethanol, etc.; aromatic hydroxycarboxylic acids such as m-hydroxybenzoic acid, 2,6-dihydroxynaphthoic acid, etc.; as well as p-aminophenol, p-aminobenzoic acid and the like, so far as the additional comonomer units do not interfere with the liquid-crystalline property of the copolymers.

Methods for producing the liquid-crystalline resins mentioned above for use in the invention are not specifically defined, and the resins can be produced in accordance with any known polycondensation methods for producing conventional polyesters.

For example, to produce the liquid-crystalline polyesters noted above, the following methods are preferred.

(1) A polyester is prepared from components except p-hydroxybenzoic acid, then this is heated and melted with p-acetoxybenzoic acid in a dry nitrogen stream atmosphere to form copolymerized polyester fragments through acidolysis, and thereafter the viscosity of the resulting copolyester is increased under reduced pressure.

(2) P-acetoxybenzoic acid, a diacylated, aromatic dihydroxy compound such as 4,4'-diacetoxybiphenyl, diacetoxybenzene or the like, and an aromatic dicarboxylic acid such as 2,6-naphthalene-dicarboxylic acid, terephthalic acid, isophthalic acid or the like are subjected to deacetylating polycondensation.

(3) P-hydroxybenzoic acid, an aromatic dihydroxy compound such as 4,4'-dihydroxybiphenyl, hydroquinone or the like, an aromatic dicarboxylic acid such as 2,6-naphthalene-dicarboxylic acid, terephthalic acid, isophthalic acid or the like, and acetic anhydride are subjected to acylation at the phenolic hydroxyl groups followed by deacetylating polycondensation.

(4) Phenyl p-hydroxybenzoate, an aromatic dihydroxy compound such as 4,4'-dihydroxybiphenyl, hydroquinone or the like, and a diphenyl ester of an aromatic dicarboxylic acid such as 2,6-naphthalene-dicarboxylic acid, terephthalic acid, isophthalic acid or the like are subjected to dephenolating polycondensation.

(5) P-hydroxybenzoic acid and an aromatic dicarboxylic acid such as 2,6-naphthalene-dicarboxylic acid, terephthalic acid, isophthalic acid or the like are reacted with a predetermined amount of diphenyl carbonate to prepare a diphenyl ester, and then reacted with an aromatic dihydroxy compound such as 4,41-dihydroxybiphenyl, hydroquinone or the like for dephenolating polycondensation.

(6) The method of (2) or (3) is effected in the presence of a polymer or oligomer of a polyester such as polyethylene terephthalate or the like, or in the presence of a bis(β-hydroxyethyl) ester of an aromatic dicarboxylic acid such as bis(β-hydroxyethyl) terephthalate or the like.

The polycondensation for producing the liquid-crystalline resins may be effected in the absence of a catalyst, for which, however, usable is a metal compound such as stannous acetate, tetrabutyl titanate, potassium acetate, sodium acetate, antimony trioxide or the like, or even a metal of magnesium.

The logarithmic viscosity of the liquid-crystalline resin for use in the invention can be measured in pentafluorophenol, which is preferably not smaller than 0.03 g/dl when measured therein at a concentration of 0.1 g/dl at 60° C. More preferably, it is from 0.05 to 10.0 dl/g.

The liquid crystal transition temperature of the liquid-crystalline resin for use in the invention is preferably not higher than the melting point of the polyamide resin to be combined with it, more preferably not higher than the melting point of the polyamide resin −10° C., even more preferably not higher than the melting point of the polyamide resin −20 C. This is because the liquid-crystalline resin, of which the liquid crystal transition temperature is lower than the melting point of the polyamide to be combined with it, can uniformly disperse in the polyamide resin, and therefore produces better results in the invention.

To measure the liquid crystal transition temperature of the liquid-crystalline resin, a thin test piece of the resin is prepared, mounted on a sample stand of a polarization microscope and gradually heated thereon, whereupon the temperature at which the test piece emits milky light under shear stress is measured. Of most preferred liquid-crystalline resins for use in the invention, the liquid crystal transition temperature is lower by about 20° C. or so than the melting point thereof.

The melt viscosity of the liquid-crystalline resin for use in the invention is not specifically defined. In order to obtain better results in the invention, however, the melt viscosity of the liquid-crystalline resin, as measured at a temperature of the melting point of the polyamide resin to be combined with it +25° C., is preferably not higher than 50 Pa·s, more preferably from 0.1 to 30 Pa·s, most preferably from 0.5 to 25 Pa·s. The melt viscosity is measured, using a vertical flow tester in which the sample is made to flow out through a nozzle having a diameter of 0.5 mmφ and a length of 10 mm at a shear rate of 1,000 (1/sec).

In the composition of the invention, the amount of the liquid-crystalline resin to be added to the polyamide resin is from 0.01 to 100 parts, but preferably from 0.05 to 80 parts by weight, more preferably from 0.1 to 10 parts by weight, relative to 100 parts by weight of the polyamide resin. Within the defined range, the liquid-crystalline resin added does not interfere with the intrinsic characteristics of the polyamide resin, and the resulting resin composition can have various additional advantages. For example, the composition has good fluidity, the amount of cushion resin needed for molding the composition fluctuates little, failure such as cobwebbing in molding the composition is reduced, and the moldings of the composition have good impact resistance and good appearance.

The acid anhydride to be present in the composition of the invention includes, for example, benzoic anhydride, isobutyric anhydride, itaconic anhydride, octanoic anhydride, glutaric anhydride, succinic anhydride, acetic anhydride, dimethylmaleic anhydride, decanoic anhydride, trimellitic anhydride, 1,8-naphthalic anhydride, phthalic anhydride, maleic anhydride, etc. Of those, preferred are succinic anhydride, 1,8-naphthalic anhydride, phthalic anhydride, maleic anhydride, etc. More preferred are succinic anhydride and phthalic anhydride.

The amount of the acid anhydride to be added to the polyamide resin of the invention is from 0.01 to 5 parts by weight, but preferably from 0.05 to 3 parts by weight, more preferably from 0.1 to 2 parts by weight. If the amount of the acid anhydride added is too small, the resin composition could not have the advantages as above. For example, the composition could not have good fluidity. If the amount is too much, on the other hand, the composition will generate much gas while it is compounded or while it is molded. Owing to the gas, smooth filling of the composition into molds is often difficult, and, in addition, the moldings will be yellowed and will have many voids therein. Moreover, the moldings will have poor appearance, and their mechanical properties are degraded.

The condition of the acid anhydride existing in the polyamide resin composition of the invention is not specifically defined. For example, it may be in the composition in the form of the acid anhydride itself, or may be in any other forms thereof as reacted with water or with the polyamide or liquid-crystalline resin or even with their monomers or oligomers.

The method for mixing the polyamide resin, the liquid-crystalline resin and the acid anhydride to prepare the composition of the invention is not specifically defined, but, in general, they are preferably kneaded in melt. For the melt-kneading, employable is any known method. For example, the constituent components may be kneaded in melt at a temperature falling between 180 and 380° C., in any of Bumbury mixers, rubber rollers, kneaders, single-screw or double-screw extruders and the like, to give the resin composition of the invention. Preferably, however, they are mixed in extruders. For this, the order of mixing is not specifically defined. Preferably, the polyamide resin and the acid anhydride are kneaded together. For example, the polyamide resin and the acid anhydride are first blended, to which is added the liquid-crystalline resin. When a two-stage extruder equipped with a side feeder is used, the former two are first blended therein and the liquid-crystalline resin is added to the resulting mixture via the side feeder. Also preferably, the polyamide resin, the liquid-crystalline resin and the acid anhydride may be blended all at a time.

A filler may be added to the polyamide resin composition of the invention for the purpose of further improving the characteristics of the composition, for example, for increasing the mechanical strength of composition. The filler is not specifically defined, and any of fibrous, tabular, powdery or granular fillers are employable herein. Concretely, the filler for use in the invention includes fibrous or whisker-like fillers, for example, glass fibers, carbon fibers of PAN, pitch or the like, metal fibers such as stainless steel fibers, aluminium fibers, brass fibers, etc., organic fibers such as aromatic polyamide fibers, etc., as well as gypsum fibers, ceramic fibers, asbestos fibers, zirconia fibers, alumina fibers, silica fibers, titanium oxide fibers, silicon carbide fibers, rock wool, potassium titanate whiskers, barium titanate whiskers, aluminium borate whiskers, silicon nitride whiskers, etc.; and also other powdery, granular or tabular fillers of, for example, mica, talc, kaolin, silica, calcium carbonate, glass beads, glass flakes, glass microballoons, clay, molybdenum disulfide, wollastonite, titanium oxide, zinc oxide, calcium polyphosphate, graphite, etc. Of those fillers, preferred are glass fibers and carbon fibers. Especially preferred are PAN carbon fibers for making the composition have electroconductivity. The type of glass fibers for use in the invention is not specifically defined, and any and every one able to be generally used for reinforcing resins is employable herein. For example, they may be selected from long-fiber type or short-fiber type, chopped strands and milled fibers, etc. Two or more of those fillers may be used in combination. The fillers for use in the invention may be surface-treated with any known coupling agents (e.g., silane coupling agents, titanate coupling agents, etc.) or any other surface-treating agents.

Glass fibers for use in the invention may be coated with a thermoplastic resin such as ethylene/vinyl acetate copolymer or the like, or with a thermosetting resin such as epoxy resin or the like, or may be bundled up therewith.

In general, the amount of the filler to be in the composition is at most 300 parts by weight, but preferably from 10 to 250 parts by weight, more preferably from 20 to 150 parts by weight, relative to the total amount of the polyamide resin, the liquid-crystalline resin and the acid anhydride of being 100 parts by weight.

A copper compound is preferably added to the polyamide resin composition of the invention so as to improve the long-term heat resistance of the composition. Specific examples of the copper compound include cuprous chloride, cupric chloride, cuprous bromide, cupric bromide, cuprous iodide, cupric iodide, cupric sulfate, cupric nitrate, copper phosphate, cuprous acetate, cupric acetate, cupric salicylate, cupric stearate, cupric benzoate, and complexes of an inorganic copper halide such as that mentioned above with xylylenediamine, 2-mercaptobenzimidazole, benzimidazole, etc. Of those, preferred are monovalent copper compounds, especially monovalent copper halides. Preferred examples of the compounds are cuprous acetate, cuprous iodide, etc. In general, the amount of the copper compound to be added is preferably from 0.01 to 2 parts by weight, more preferably from 0.015 to 1 part by weight, relative to 100 parts by weight of the polyamide resin. If the amount is too large, free metal copper will segregate out in the melt of the composition being molded, whereby the moldings will be unfavorably colored, degrading their commercial value. In accordance with the invention as combined with the copper compound, an alkali halide may be added to the composition. As examples of the alkali halide, mentioned are lithium chloride, lithium bromide, lithium iodide, potassium chloride, potassium bromide, potassium iodide, sodium bromide and sodium iodide. Especially preferred are potassium iodide and sodium iodide.

Adding an alkoxysilane having at least one functional group selected from epoxy, amino, isocyanato, hydroxyl, mercapto and ureido groups, to the resin composition of the invention is preferred, as effectively improving the mechanical strength and the stiffness of the moldings of the composition. Specific examples of the alkoxysilane include epoxy-having alkoxysilanes such as γ-glycidoxypropyltrimethoxysilane, γ-glycidoxypropyltriethoxysilane, β-(3,4-epoxycyclohexyl)ethyltrimethoxysilane, etc.; mercapto-having alkoxysilanes such as mercaptopropyltrimethoxysilane, γ-mercaptopropyltriethoxysilane, etc.; ureido-having alkoxysilanes such as γ-ureidopropyltriethoxysilane, γ-ureidopropyltrimethoxysilane, γ-(2-ureidoethyl)aminopropyltrimethoxysilane, etc.; isocyanato-having alkoxysilanes such as γ-isocyanatopropyltriethoxysilane, γ-isocyanatopropyltrimethoxysilane,
γ-isocyanatopropylmethyldimethoxysilane,
γ-isocyanatopropylmethyldiethoxysilane,
γ-isocyanatopropylethyldimethoxysilane,
γ-isocyanatopropylethyldiethoxysilane,
γ-isocyanatopropyltrichlorosilane, etc.; amino-having alkoxysilanes such as γ-(2-aminoethyl) aminopropylmethyldimethoxysilane, γ-(2-aminoethyl) aminopropyltrimethoxysilane, γ-aminopropyltrimethoxysilane, etc.; hydroxyl-having alkoxysilanes such as γ-hydroxypropyltrimethoxysilane, γ-hydroxypropyltriethoxysilane, etc.

The resin composition of the invention may contain any ordinary additives, for example, antioxidants and heat stabilizers (e.g., hindered phenols, hydroquinones, phosphites and their substituted derivatives, etc.); ultraviolet absorbents (e.g., resorcinols, salicylates, benzotriazoles, benzophenones, etc.); coloration inhibitors such as phosphites, hypophosphites, etc.; lubricants and mold-release agents (e.g., montanic acid and its salts, esters and half-esters, stearyl alcohol, stearamides, polyethylene wax, etc.); colorants containing dye (e.g., Nigrosine, etc.) and pigment (e.g., cadmium sulfide, phthalocyanine, etc.); electroconductive agents and colorants such as carbon black, etc.; nucleating agents; plasticizers; flame retardants, (e.g., red phosphorus, magnesium hydroxide, melamine, cyanuric acid and its salts, poly-(styrene bromide), brominated polystyrene, polyphenylene ether bromides, brominated epoxy compounds, polycarbonate bromides, etc.); flame retardation promoters (e.g., antimony compounds, fluorine resins, phenolic resins, etc.); antistatic agents; etc. Those additives may impart predetermined characteristics to the composition.

To add them to the resin composition, the inorganic filler and the additives mentioned above are preferably kneaded with the constituent components for the composition in melt. For the melt-kneading, employable is any known method. For example, using any of Bumbury mixers, rubber rollers, kneaders, single-screw or double-screw extruders or the like, they are kneaded with the constituent components in melt at a temperature falling between 180 and 38°0C. Those additives may be added to the resin composition at any stage of preparing the composition by mixing the constituent components of the polyamide resin, the acid anhydride and the liquid-crystalline resin according to the preferred methods mentioned above. Concretely, the polyamide resin and the acid anhydride are first mixed in melt, to which the liquid-crystalline resin and the filler are added; or the components are all mixed at a time; or the polyamide resin, the acid anhydride and the liquid-crystalline resin are first mixed, to which are added the filler and other additives; or the polyamide resin, the acid anhydride and the liquid-crystalline resin are first mixed to prepare a resin composition (A), and the resulting resin composition (A) is mixed with a filler to prepare a high-concentration composition (master) (B). Any of those methods are employable herein.

To produce moldings of the resin composition of the invention, employable are any ordinary molding methods of, for example, injection molding, extrusion molding, blow molding, press molding, injection-press molding or the like, in which are formed three-dimensional moldings, sheets, containers, pipes, etc. As having good fluidity, the composition is especially preferably molded into moldings having thin-wall parts (for example, tabular moldings or box-type moldings, but preferably box-type moldings), in particular into those with thin-wall parts having a thickness of not larger than 1.0 mm. Concretely, the composition is especially effectively molded into moldings with thin-wall parts, in which the thin-wall parts having a thickness of at most 1.0 mm account for at least 10% of the total surface area of the molding, more preferably the thin-wall parts having a thickness of at most 1.0 mm account for at least 15% of the same, even more preferably the thin-wall parts having a thickness of at most 0.8 mm account for at least 10% of the same. For molding the composition into those moldings, preferred is a method of injection molding or injection-press molding.

As mentioned hereinabove, the polyamide resin composition of the invention has various novel advantages. Specifically, the composition does not lose good characteristics intrinsic to ordinary polyamide resins, and it keeps good fluidity all the time while it is molded. The producibility of moldings from the composition is good, in that the amount of cushion resin needed for molding the composition fluctuates little, and that failure such as cobwebbing in molding the composition is reduced. In addition, the moldings of the composition have good impact resistance and good appearance. Owing to its characteristics, therefore, the resin composition can be molded into various moldings. For example, the moldings are useful as parts for electric and electronic appliances, such as typically various gears, various cases, sensors, LEP lamps, connectors, sockets, resistors, relay cases, switches, coil bobbins, capacitors, variable capacitor cases, optical pickups, oscillators, plates for various terminals, transformers, plugs, boards for printed circuits, tuners, speakers, microphones, headphones, small-sized motors, magnetic head bases, power modules, housings, semiconductors, parts for liquid crystal displays, FDD carriages, FDD chassis, HDD parts, motor brush holders, parabolic antennas, computer-related parts, etc.; parts for electric appliances for household and office use, such as typically VTR parts, TV parts, irons, hair driers, rice cooker parts, microwave range parts, acoustic parts, parts for sound appliances including audios, laser discs, compact discs, etc., lighting parts, refrigerator parts, air conditioner parts, typewriter parts, word processor parts, etc.; office computer-related parts, telephone-related parts, facsimile-related parts, duplicator-related parts, washing tools; machine-related parts, such as typically various bearings including oilless bearings, stern bearings, underwater bearings, etc., motor parts, lighters, typewriters, etc.; optical instrument-related parts and precision instrument-related parts, such as typically parts for microscopes, binoculars, cameras, watches, etc.; automobile and vehicle-related parts, such as typically alternator terminals, alternator connectors, IC regulators, various valves including exhaust gas valves, etc., various pipes for fuel-related intake and emission systems, air intake nozzle snorkels, intake manifolds, fuel pumps, engine-cooling water joints, carburetor main bodies, carburetor spacers, exhaust gas sensors, cooling water sensors, oil temperature sensors, brake pad wear sensors, throttle position sensors, crank shaft position sensors, air flow meters, thermostat bases for air conditioners, air flow control valves for heaters, brush holders for radiator motors, water pump impellers, turbine veins, wiper motor-related parts, distributors, starter switches, starter relays, wire harnesses for transmissions, windshield washer nozzles, air conditioner panel switch boards, coils for fuel-related electromagnetic valves, connectors for fuses, horn terminals, insulating boards for electric parts, step motor rotors, lamp sockets, lamp reflectors, lamp housings, brake pistons, solenoid bobbins, engine oil filters, power sheet gear housings, parts for ignition coils, ignition cases, etc. In addition to those, the moldings have many other applications. In particular, the resin composition of the invention is favorable to box-type moldings, especially to those required to be lightweight, for example, audio trays for CD, DVD, etc., housings for portable telephones, boards and frames for pocket phone bells, housings for personal computers, etc., as well as housings for other various appliances and instruments. Specifically, the composition is significantly useful for box-type moldings with thin-wall parts, in which the thin-wall parts having a thickness of at most 1.0 mm account for at least 10% of the total surface area of the molding. Most preferably, the composition is used for housings for personal computers.

Now, the invention is described in more detail with reference to the following Examples, to which, however, the invention is not restricted without departing from the spirit and scope thereof.

REFERENCE EXAMPLES

A-1:

ε-caprolactam was polymerized in an ordinary manner to prepare pellets of nylon 6. As measured, the relative viscosity of the polyamide was 2.70, the melting point thereof was 222° C., and the terminal amino content thereof was $4.0 \times 10^{-6}$ equivalents/g.

A-2:

An equimolar salt of hexamethylenediamine-adipic acid was polymerized in an ordinary manner to prepare pellets of nylon 66. As measured, the relative viscosity of the polyamide was 2.75, the melting point thereof was 262° C., and the terminal amino content thereof was $4.9 \times 10^{-6}$ equivalents/g.

A-3:

An aqueous solution of a mixture of hexamethylenediammonium terephthalate (6 T salt) and aminododecanoic acid (solid concentration: 60% by weight), that had been controlled to have hexamethyleneterephthalamide units of 50 mol % and dodecamide units of 50 mol %, was fed into a pressure reactor for polymerization, heated with stirring, and reacted under a water vapor pressure of 19 kg/cm$^2$ for 1.5 hours. Then, this was gradually degassed over a period of about 2 hours, and further reacted for about 30 minutes in a normal-pressure nitrogen atmosphere. The polyamide resin thus obtained had a relative viscosity of 2.55, a melting point of 283° C., and a terminal amino content of $4.5 \times 10^{-6}$ equivalents/g.

A-4:

As in Reference Example 1, ε-caprolactam was polymerized in an ordinary manner, but 0.1 parts by weight of a terminal blocking agent, benzoic acid was added to 100 parts by weight of the monomer, ε-caprolactam. Pellets of nylon 6 were obtained. As measured, the relative viscosity of the polyamide was 2.70, the melting point thereof was 222° C., and the terminal amino content thereof was $2.1 \times 10^{-6}$ equivalents/g.

B-1:

528 parts by weight of p-hydroxybenzoic acid, 126 parts by weight of 4,4'-dihydroxybiphenyl, 112 parts by weight of terephthalic acid, 864 parts by weight of polyethylene terephthalate having an intrinsic viscosity of about 0.6 dl/g, and 586 parts by weight of acetic anhydride were fed into a reactor equipped with a stirrer and a distillation tube, and polymerized therein. As a result, obtained was a liquid-crystalline resin comprising 42.5 mol % of aromatic oxycarbonyl units, 7.5 mol % of aromatic dioxy units, 50 mol % of ethylenedioxy units, and 57.5 mol % of aromatic dicarboxylic acid units, and having a liquid crystal transition temperature of 184° C. As measured through an orifice of 0.5φ×10 mm at different temperatures at a shear rate of 1,000 sec$^{-1}$, the melt viscosity of the resin was 30 Pa·s at 247° C., 15 Pa·s at 287° C., and 1 Pa·s at 308° C.

B-2:

777 parts by weight of p-hydroxybenzoic acid, 126 parts by weight of 4,4'-dihydroxybiphenyl, 112 parts by weight of terephthalic acid, 519 parts by weight of polyethylene terephthalate having an intrinsic viscosity of about 0.6 dl/g, and 816 parts by weight of acetic anhydride were fed into a reactor equipped with a stirrer and a distillation tube, and polymerized therein. As a result, obtained was a liquid-crystalline resin comprising 62.5 mol % of aromatic oxycarbonyl units, 7.5 mol % of aromatic dioxy units, 30 mol % of ethylenedioxy units, and 37.5 mol % of aromatic dicarboxylic acid units, and having a liquid crystal transition temperature of 205° C. As measured through an orifice of 0.5φ×10 mm at different temperatures at a shear rate of 1,000 sec$^{-1}$, the melt viscosity of the resin was 35 Pa·s at 247° C., 20 Pa·s at 287° C., and 2 Pa·s at 308° C.

B-3:

907 parts by weight of p-hydroxybenzoic acid, 457 parts by weight of 2,6-hydroxynaphthoic acid, and 872 parts by weight of acetic anhydride were fed into a reactor equipped with a stirrer and a distillation tube, and polymerized therein. As a result, obtained were pellets of a resin with 100 mol % of aromatic oxycarbonyl units, having a liquid crystal transition temperature of 260° C. As measured through an orifice of 0.5φ×10 mm at different temperatures at a shear rate of 1,000 sec$^{-1}$, the melt viscosity of the resin was 120 Pa·s at 287° C., and 35 Pa·s at 308° C. However, its melt viscosity could not be measured at 247° C.

The liquid crystal transition temperature (TN) of the resins was measured, using a micrometer for melting point measurement (from Yanako).

EXAMPLES 1 TO 9, AND COMPARATIVE EXAMPLES 1 to 12

As in Table 1, the polyamide resin (A-1 to A-4) and the liquid-crystalline resin (B-1 to B-3) that had been prepared in Reference Examples, and the acid anhydride and carbon fibers having a mean length of 6 mm were weighed to be a predetermined amount each, and dry-blended. Using a single-screw (30 mmφ) extruder, the resulting blends were separately melted and pelletized. The cylinder temperature was as in Table 1, and the number of screw revolutions fell between 30 and 100 rpm. After having been dried in hot air, the pellets were fed into a Sumitomo Nestal injection molding machine, Promat 40/25 (from Sumitomo Heavy Machine Industry), and molded into test pieces in an injection-molding manner. The cylinder temperature and the mold temperature were as in Table 1. These test pieces were tested for their properties, according to the methods mentioned below.

(1) Fluidity:

Each composition sample was left in the cylinder of the molding machine for a residence time of 20 minutes, and molded into test pieces having a thickness of 0.5 mm and a width of 12.7 mm, at an injection rate of 99% and an injection pressure of 500 kgf/cm$^2$, whereupon the length of the running test piece (the length of the running resin bar) was measured.

(2) Impact Resistance:

Each test piece with no notch (thickness: 1/8 inches) was subjected to a Charpy impact test according to JIS K6911.

(3) Surface Appearance:

Square plates of 70×70×2 mm thick were produced through injection molding, and visually checked as to whether or not their surface was swollen owing to impurities, or yellowed owing to gas generation, or as to whether or not fibers are seen on their surface. "Good" in Table 1 means that the samples had good surface appearance, while "Bad" therein means that the samples had some surface failures.

(4) Cushion Resin Fluctuation:

Bending test pieces having a size of 12.7×127×3.2 mm were molded, according to a molding cycle comprising injection for 5 seconds, cooling for 10 seconds, and an on-standby period of 4 seconds. Twenty cycles were repeated, and the variation in the cushion resin being in the cylinder under pressure was measured for its standard deviation. The cushion resin is meant to indicate the amount of the resin (g) as remained in the cylinder between the tip of the screw and the nozzle, while the resin is molded through the cylinder, and this is represented relative to the position between the nozzle and the screw. For this, the standard was 5 mm. For the cushion resin, the amount of the resin for full charging in the mold plus alpha (+α) is weighed and charged into the mold (this is for removing molding failures to cause shrinkage cavities in moldings), so that the excess resin is left in the tip of the cylinder. The amount of the excess resin, α, indicates the cushion resin.

(5) Cobwebbing in Molding:

In the test of (4), the condition of the resin running out of the nozzle was checked for the presence or absence of cobwebbing around it. "Yes" in Table 1 means that cobwebbing was seen; and "No" therein means that no cobwebbing was seen.

TABLE 1

| | Polyamide Resin 100 wt. pts. | Liquid-crystalline Resin (wt. pts.) | Acid Anhydride (wt. pts.) | Filler (wt. pts.) | Working Temp. (° C.) | Mold Temp. (° C.) | Fluidity (mm) | Impact Resistance (kg · cm/cm$^2$) | Surface Smoothness | Cushion Resin σ | Cob-webbing |
|---|---|---|---|---|---|---|---|---|---|---|---|
| Example 1 | A-1 | B-1 (3) | Succinic Anhydride (0.5) | — | 250 | 80 | 120 | 6.0 | Good | 0.09 | No |
| Example 2 | A-1 | B-2 (3) | Phthalic Anhydride (0.8) | — | 250 | 80 | 117 | 5.8 | Good | 0.11 | No |
| Example 3 | A-2 | B-1 (3) | Succinic Anhydride (0.5) | — | 290 | 80 | 131 | 3.9 | Good | 0.14 | No |
| Example 4 | A-2 | B-2 (3) | Succinic Anhydride (0.5) | — | 290 | 80 | 129 | 3.8 | Good | 0.14 | No |
| Example 5 | A-3 | B-2 (3) | Phthalic Anhydride (0.5) | — | 305 | 80 | 134 | 3.2 | Good | 0.18 | No |
| Example 6 | A-1 | B-1 (3) | Succinic Anhydride (0.5) | CF (45) | 270 | 80 | 88 | 4.2 | Good | 0.10 | No |
| Example 7 | A-1 | B-1 (25) | Succinic Anhydride (0.5) | — | 270 | 80 | 145 | 4.2 | Good | 0.16 | No |
| Example 8 | A-2 | B-3 (3) | Phthalic Anhydride (0.5) | — | 290 | 80 | 108 | 2.7 | Good | 0.21 | No |
| Example 9 | A-4 | B-1 (3) | Succinic Anhydride (0.3) | CF (45) | 270 | 80 | 88 | 4.0 | Good | 0.10 | No |
| Compara. Example 1 | A-1 | — | — | — | 250 | 80 | 90 | 4.0 | Good | 0.25 | Yes |
| Compara. Example 2 | A-2 | — | — | — | 290 | 80 | 96 | 2.2 | Good | 0.27 | Yes |
| Compara. Example 3 | A-3 | — | — | — | 305 | 80 | 101 | 1.7 | Good | 0.33 | Yes |
| Compara. Example 4 | A-1 | — | Succinic Anhydride (0.5) | — | 250 | 80 | 92 | 3.5 | Bad | 0.24 | Yes |
| Compara. Example 5 | A-1 | B-1 (3) | — | — | 250 | 80 | 86 | 3.8 | Good | 0.16 | No |
| Compara. Example 6 | A-1 | B-1 (200) | Succinic Anhydride (0.5) | — | 250 | 80 | 130 | 1.2 | Bad | 0.73 | No |
| Compara. Example 7 | A-1 | B-1 (3) | Succinic Anhydride (7.0) | — | 250 | 80 | 125 | 2.0 | Bad | 0.45 | Yes |
| Compara. Example 8 | A-1 | — | — | CF (45) | 270 | 80 | 66 | 3.0 | Bad | 0.21 | Yes |
| Compara. Example 9 | A-1 | B-1 (3) | — | CF (45) | 270 | 80 | 62 | 2.6 | Good | 0.18 | No |
| Compara. Example 10 | A-1 | — | Succinic Anhydride (0.5) | CF (45) | 270 | 80 | 67 | 2.4 | Bad | 0.22 | Yes |
| Compara. Example 11 | A-4 | — | — | CF (45) | 270 | 80 | 67 | 3.0 | Bad | 0.22 | Yes |
| Compara. Example 12 | A-4 | B-1 (3) | — | CF (45) | 270 | 80 | 64 | 2.4 | Good | 0.20 | No |

From the data in Table 1 above, it is known that the polyamide resin composition of the invention all the time has good fluidity even when it is left for a relatively long period of residence time in a cylinder of a large-sized molding machine while it is molded, and has good moldability. For its moldability, the resin composition of the invention is free from significant fluctuation in the amount of the cushion resin remaining in the cylinder, and from cobwebbing around the nozzle through which it runs out. In addition, it is also known therefrom that the moldings of the resin composition of the invention all have good mechanical strength as indicated by the impact resistance, and have good surface appearance.

While the invention has been described in detail and with reference to specific embodiments thereof, it will be apparent to one skilled in the art that various changes and modifications can be made therein without departing from the spirit and scope thereof.

What is claimed is:

1. A polyamide resin composition comprising 100 parts by weight of a polyamide resin, 0.01 to 100 parts by weight of a liquid-crystalline resin, and from 0.01 to 5 parts by weight of an acid anhydride said acid anhydride being at least one anhydride selected from the group consisting of succinic anhydride, 1,8-naphthalic anhydride and phthalic anhydride.

2. The polyamide resin composition as claimed in claim 1, wherein the liquid crystal transition temperature of the liquid-crystalline resin is equal to or less than the melting point of the polyamide resin.

3. The polyamide resin composition as claimed in claim 1, which further comprises a filler in an amount of from 0.5 to 300 parts by weight, relative to the total of the polyamide resin, the liquid-crystalline resin and the acid anhydride being 100 parts by weight.

4. The polyamide resin composition as claimed in claim 1, wherein the melt viscosity of the liquid-crystalline resin is equal to or less than 50 Pa·s, as measured at a temperature of the melting point of the polyamide resin +25° C., and at a shear rate of 1000 $sec^{-1}$.

5. The polyamide resin composition as claimed in claim 1, wherein the acid anhydride is at least one anhydride selected from the group consisting of succinic anhydride, 1,8-naphthalic anhydride and phthalic anhydride.

* * * * *